Patented Nov. 4, 1924.

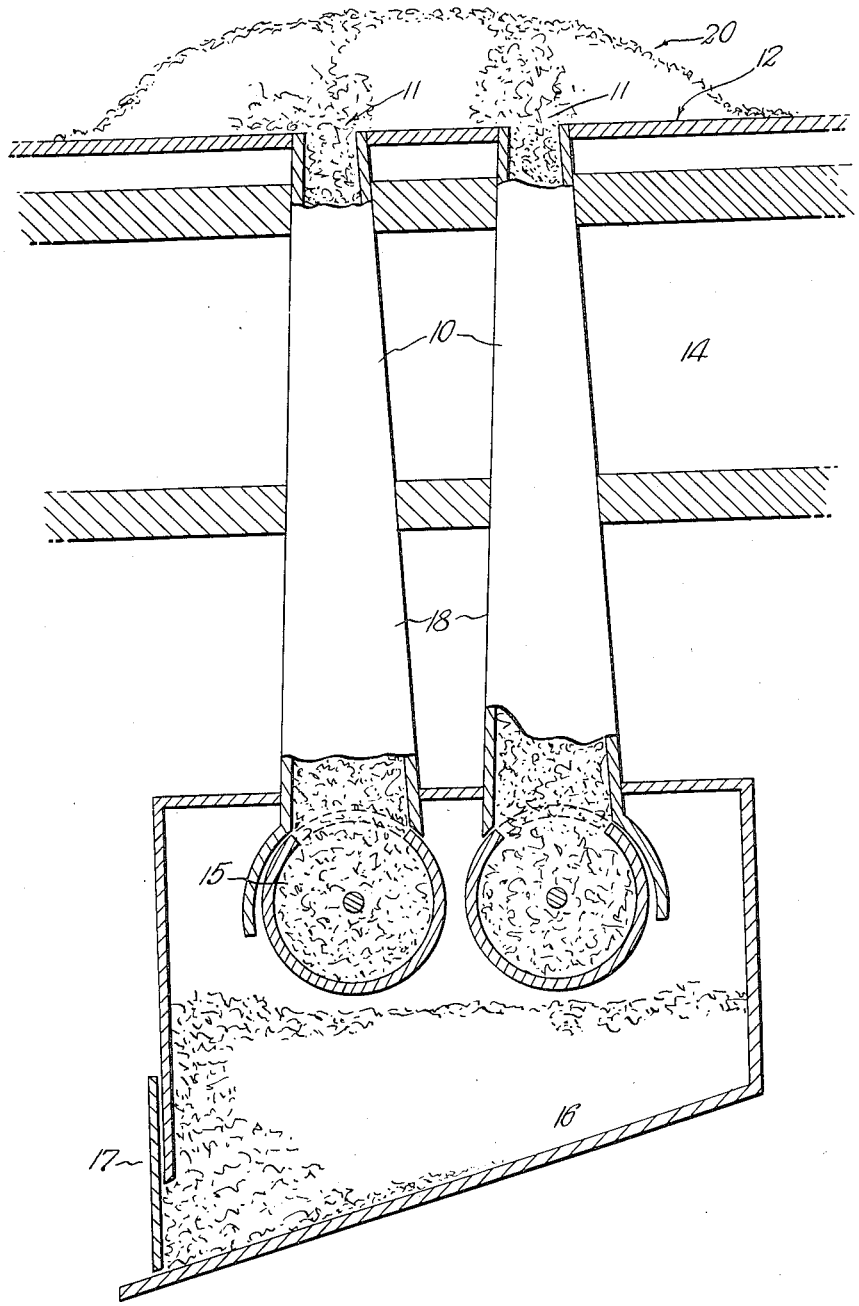

1,513,812

UNITED STATES PATENT OFFICE.

EDWIN THOMAS HENDERSON, OF BROKEN HILL, NEW SOUTH WALES, AUSTRALIA.

PROCESS FOR TREATING OXIDIZED SULPHIDE ORES.

Application filed February 26, 1923. Serial No. 621,277.

*To all whom it may concern:*

Be it known that I, EDWIN THOMAS HENDERSON, subject of the King of Great Britain and Ireland, residing at % The Broken Hill Proprietary Company Limited, Broken Hill, in the county of Yancowinna and State of New South Wales, Australia, have invented certain new and useful Improvements in the Process for Treating Oxidized Sulphide Ores, of which the following is a specification.

This invention relates to the concentration of oxidized sulphide ores of lead, or of lead and zinc, or of other metals, and consists in a novel method of conditioning such oxidized ores to make them susceptible to flotation treatment. Flotation, as is well known, is substantially ineffective on oxidized sulphide ores, for the reason that a substantial proportion of the values is retained with the gangue, and in order to make such ores practically amenable for flotation treatment, it is necessary to condition them so that the flotation characteristics of the metal values will be exalted relatively to the gangue.

The invention consists in submitting dry slimes or other dry oxidized sulphide ores in a powdered or finely granular condition and in a dry state to heat in the absence of oxygen until the temperature reaches about 700° C., and thereafter in cooling off the ores whilst excluding access of oxygen to them. The invention is usable whether the ores be wholly or only partially oxidized.

It is acknowledged that processes have been proposed heretofore which consist in submitting certain ores and ore products to heat treatment in the presence of reducing reagents to obtain the values in fine metal condition; or otherwise to submit them to heat treatment to convert metals into sulphates. Such processes are distinguished from the present process in their objectives as well as in the ultimate result.

The period of treatment necessary is brief, a few minutes sufficing to procure reactions in the ore body which alter it so that its constituents behave differently during subsequent flotation treatment. Thus, in the case of lead and zinc the compounds of those metals present in the ore lose oxygen to iron and manganese also present, with the result that the oxidized lead and zinc revert to sulphide form, and the iron and manganese compounds are raised to a higher state of oxidation. The degree of temperature used is approximately 700° C., and the time of treatment is no longer than is necessary for the bringing of the ore to that temperature throughout its bulk. The ores reconditioned by this method are amenable to flotation separation according to any appropriate known flotation process.

The apparatus devised by me for carrying out the process continuously is shown in the accompanying semi-diagrammatic drawing. This apparatus consists of a battery of vertically disposed oven tubes 10 which are heated externally by furnace flue gases passing through a flue 14. These tubes are tapered in section, with the larger diameter at the bottom end to facilitate free downward movement of the ore under treatment, and they are constructed of chromium or fire clay which will withstand the operation of the process. At their top ends the tubes 10 are open at 11 through vents in a charging deck 12. The ore to be treated is heaped (20) on said deck 12 over the vents 11 so that it will flow in the tubes 10 by gravity as they are discharged through their bottom ends. The heap of ore 20 over the top ends 11 of the tubes 10 seals them sufficiently against entrance of air downwards. At their bottom ends the tubes 10 are fitted with rotating barrel gates 15, or with any other mechanical devices of a known kind arranged to permit quantities of charge to pass out of each tube by gravity at predetermined intervals or in a continuous stream into a cooling off container 16 which is closed to atmosphere. Thence the cooled ores are taken via the gate 17 direct to the flotation apparatus, being crushed before reaching the flotation apparatus if crushing be found necessary for the purpose of freeing the floatable particles from the gangue. By making the tubes 10 in the battery of sufficient length, their lower end portions 18 below the flue 14 may be made to serve as cooler chambers in which the temperature of the treated ore may fall to a greater or less extent before they reach the cooling off container 16. The hot ore from the tubes 10 may be delivered direct into water from their bottom ends, in which case rapid cooling is effected and the provision of the cooling-off container 16 is rendered unnecessary.

It is to be understood that any other type of treatment apparatus may be used in which the temperature of the ore may be brought up to approximately 700° C., in the absence of oxygen in the enveloping atmosphere therein whilst the treatment is being effected. Thus, for instance, the ore may be heated directly in a rabbling furnace or in a rotating furnace in which producer gas is burnt, provided always that adequate precautions are observed for substantially inhibiting access of free oxygen to the ore during the treatment and until it is cooled off. To minimize accidental entrance of air from the external atmosphere it is preferred to operate it under light plenum pressure.

The small volumes of oxygen occluded in the ore and brought into the treatment chamber with the ore will have negligible effect in the operation of the process, and it is to be understood therefore that for the purposes of the process an atmosphere containing such accidental negligible proportion of oxygen may be regarded as an atmosphere containing no free oxygen.

It is further to be understood that the result obtained by the process is not negatived either in whole or in part by the presence of reducing agents, so long as those reducing agents are not operative for procuring the reduction of the values to metal condition. The presence of reducing agents is unnecessary for the purposes of the process. The claims are accordingly to be construed to cover any case in which reconversion of sulphides without reduction to metal is attained by heat treatment in the substantial absence of oxygen during the heating stage and during the cooling-off stage, whether or not reducing agents be present in the ore during the treatment. In certain cases it may be found desirable to introduce sufficient reducing agent to absorb accidental oxygen found in the apparatus, and to procure liberation of heat which will assist in promoting the desired reaction. The essential difference to be regarded in contrast with the known heating processes is that the objective in my case is to avoid reduction to metal but to effect reconversion of the sulphides in oxidized sulphide ores which are destined for flotation treatment, whilst in the known processes the objective has been to procure reduction to metal.

What I claim as my invention and desire to secure by Letters Patent is:—

1. A process for treating oxidized dry sulphide ores in a state of fine subdivision preparatory to submitting them to flotation for the separation of sulphides from gangue, with the object of reconverting the sulphides which consists in heating the ores until they attain a temperature of 700° C. approximately, in a chamber the atmosphere in which contains no free oxygen and in which chamber no reducing agent effective for reducing values to metal is contained, and thereafter cooling the said ores without permitting access of oxygen to them during the cooling stage.

2. A process for reconverting sulphides in oxidized sulphide ores and thereby exalting their flotation characteristics, which consists in finely dividing and drying said ores, enclosing them in a chamber from which free oxygen is excluded and which does not contain a reducing agent effective for reducing values to metal, raising their temperature therein to 700° C. or thereabouts, and finally cooling them down to normal temperature without permitting access of oxygen to them during the cooling stage.

In testimony whereof I affix my signature.

EDWIN T. HENDERSON.